United States Patent
Vojtech et al.

(10) Patent No.: US 8,582,967 B2
(45) Date of Patent: Nov. 12, 2013

(54) DEVICE FOR MULTICAST OF OPTICAL SIGNALS IN THE INTERNET AND OTHER NETWORKS

(75) Inventors: Josef Vojtech, Praha (CZ); Miloslav Hula, Krivoklát (CZ); Jan Radil, Praha (CZ); Miroslav Karásek, Kolin (CZ); Stanislav Síma, Sázava (CZ); Jan Nejman, Mladá Boleslav (CZ); Petr Holub, Brno (CZ)

(73) Assignee: Cesnet, Zajmove Sdruzeni Právnických Osob, Praha (CZ)

( * ) Notice: Subject to any disclaimer, the term of this patent is extended or adjusted under 35 U.S.C. 154(b) by 454 days.

(21) Appl. No.: 12/745,581

(22) PCT Filed: Dec. 1, 2008

(86) PCT No.: PCT/CZ2008/000143
§ 371 (c)(1),
(2), (4) Date: Jun. 1, 2010

(87) PCT Pub. No.: WO2009/071036
PCT Pub. Date: Jun. 11, 2009

(65) Prior Publication Data
US 2010/0310254 A1 Dec. 9, 2010

(30) Foreign Application Priority Data
Dec. 4, 2007 (CZ) ................................. PV 2007-849

(51) Int. Cl.
*H04B 10/00* (2013.01)
*H04Q 11/00* (2006.01)

(52) U.S. Cl.
USPC .............................................. 398/45; 398/66

(58) Field of Classification Search
USPC ......................................... 398/45–57, 66–73
See application file for complete search history.

(56) References Cited

U.S. PATENT DOCUMENTS

| 5,488,501 A | 1/1996 | Barnsley |
|---|---|---|
| 6,229,932 B1 | 5/2001 | Fukashiro et al. |

(Continued)

FOREIGN PATENT DOCUMENTS

| EP | 1 349 417 A | 10/2003 |
|---|---|---|
| JP | 2005-223418 A | 8/2005 |
| TW | 276314 B | 3/2007 |
| WO | WO 01/86998 A1 | 11/2001 |
| WO | WO 2004/095875 A1 | 11/2004 |

OTHER PUBLICATIONS

International Search Report (PCT/ISA/210) for PCT/CZ2008/000143 dated Jun. 17, 2009.

(Continued)

*Primary Examiner* — Leslie Pascal
(74) *Attorney, Agent, or Firm* — Buchanan Ingersoll & Rooney PC

(57) ABSTRACT

Device for multicast of optical signals in the Internet and other networks is formed by an electronic part and an optical part. The electronic part consists of a control module, an interface module formed by a power supply block, a block for measuring basic operational parameters of the whole device and an interface, and by a power supply part. The power supply block of the interface module is connected to the power supply part, to the optical part and to the control module. The interface is connected to the optical part and to the control module, and the block for measuring basic operational parameters of the whole device is connected to the power supply part and to the control module. Input/output interfaces involving a standard interface for communication with a user and/or an interface for communication in an Ethernet network and/or an interface via RS 232 and/or an interface for communication via a serial USB bus are connected to the control module. The optical part of the device is designed as a double-stage with a first stage formed by M passive wide-spectrum optical splitters, each of which is equipped with N outputs and a second stage is realized by N wide-spectrum optical switches, each of which is equipped with M inputs.

4 Claims, 3 Drawing Sheets

(56) References Cited

U.S. PATENT DOCUMENTS

| | | | |
|---|---|---|---|
| 6,771,905 B1* | 8/2004 | Bortz | 398/45 |
| 2002/0109878 A1 | 8/2002 | Qiao | |
| 2002/0191890 A1* | 12/2002 | Gottlieb et al. | 385/16 |
| 2003/0026524 A1 | 2/2003 | Kakizaki et al. | |
| 2004/0208172 A1 | 10/2004 | Ovadia et al. | |
| 2005/0163430 A1 | 7/2005 | Noirie et al. | |

OTHER PUBLICATIONS

Written Opinion (PCT/ISA/237) for PCT/CZ2008/000143 dated Jun. 17, 2009 and Informal Comments dated Jul. 27, 2009.

* cited by examiner

DEVICE FOR MULTICAST OF OPTICAL SIGNALS IN THE INTERNET AND OTHER NETWORKS

TECHNICAL FIELD

The invention deals with a device for all-optical multicast of optical signals. It belongs in the sphere of computer networks, telecommunication technology and services.

BACKGROUND ART

Until recently, a point-to-point (from source to recipient) communication in the Internet, computer networks and data networks was definitely the prevailing way. Current applications, multimedia in particular, such as video conferences or television and radio broadcast via networks, however often transport data stream from a single source to multiple recipients. In order to ensure that transmission capacities for this purpose are still sufficient, or that their exploitation is economic, data stream is replicated, i.e. copied, and split not at the source but in a network point closer to recipients. Data stream replication so far is carried out by transmission devices—switches or routers, which transform optical signal to electronic signal, store it by parts, e.g. packets, into the memory of the switch, replicate it and re-transform each created copy from electronic form back to optical signal. This rather demanding action imposes increased load for switch or router, especially when implemented only as an additional software feature without special hardware support. Replication method mentioned above typically results in repeated gradual copying of input data into relevant output queues. These data are processed by the switch or router simultaneously along with processing other transmissions. This fact then causes non-deterministic delay introduced in data stream, so-called jitter, and may result in random data losses. These effects in particular may rather negatively affect quality of transmitted, especially multimedia, content, which in order to ensure acceptable perception by human senses demands wide bandwidth, low loss rate and low jitter. Jitter is represented by undesired and typically also non-deterministic delay variations and other signal characteristics and in connection with multimedia transmissions these may result for instance in jerky or broken image or sound.

On the contrary, all-optical replication of signals, given by its principle, takes place in real time and the output data streams are exact copies of input data stream. Therefore, no non-deterministic delays and data losses may occur. Although products of photonic industry suitable as components for all-optical replication solutions exist for many years already, no devices applicable for large research networks and subsequently for large commercial networks have been available so far. Existing devices addressing this issue show significant limitations, such as limited number of splitting, narrow band of signal wavelengths—typically C-band only, missing functional features for direct use as a device for multicast of optical signal in the Internet and other networks.

SUMMARY OF THE INVENTION

Disadvantages mentioned above are removed by a device for wide-spectrum, reconfigurable, non-blocking multicast of optical signals in the Internet and other networks according to the presented solution. Principle of this device is that it consists of optical part ensuring reconfigurable optical multicast and of electronic part, and that the device does not convert transmitted optical signals to electronic signals.

Electronic part of the device consists of an interface module, control module and power supply part. Interface module is formed by power supply block, block for measuring basic operational parameters of the whole device and an interface and ensures the following functions: it provides communication of the optical part with control module, distributes power from the power supply part for the optical part+control module and it monitors basic operational parameters of the device. Power supply block of the interface module is connected to the power supply part, optical part and control module, and the interface is connected to optical part and control module, and block for measuring basic operational parameters of the whole device is connected to the power supply part and control module. Control module provides for the world outside the access to input/output interfaces, such as standard interface for communication with user, interface for communication in Ethernet network, interface via RS 232 and interface for communication via standard serial bus USB.

In order to achieve minimum insertion loss, the optical part with M inputs $I_m$, $1 \leq m \leq M$, and N outputs $O_n$, $1 \leq n \leq N$, is designed as double-stage, only. First stage performs branching of M input signals in such a way that each input $I_m$ is split into N contributory signals $P_{m1} \ldots P_{mN}$. This stage is realized by M wide-spectrum optical splitters, each with N outputs. Second stage of the optical part then performs assignment of required contributory signal to relevant output. This stage is realized by N wide-spectrum optical switches, each with M inputs in such a way that inputs of each wide-spectrum optical switch n, $1 \leq n \leq N$, are connected to contributory signals $P_{1n} \ldots P_{Mn}$. Output of each wide-spectrum optical switch n is then directly assigned to the output $O_n$ of the device.

Optical part of the device is bi-directional and therefore the sequence of stages is irrelevant. Optical part of the device can thus be used in both directions, both in direction from inputs to outputs and vice versa. Optical part of the device also exhibits linear behavior and may therefore be used not only for multicasts of individual optical signals but also for entire groups of pre-grouped, multiplexed, signals. Optical part operates in very wide spectrum of wavelengths—from O-band to L-band—and in addition it shows identical insertion losses for any internal combination of the optical part.

Developed and tested device uses as its control module a low-power single-board computer compatible with x86 family. Power supply part is formed by two modules of redundant power supply sources, which may be either alternating current sources of voltage 230 V and/or direct current sources of voltage 48 V. The device uses so-called open software, the computer is based on Linux operating system. Engineers and researchers are relatively quite familiar with this operating system and it allows easy further development and enhancements, which due to open licenses cannot be blocked by particular manufacturer.

Submitted solution and the developed and tested device offer controlled replication of optical input signals in very wide spectrum of wavelengths without converting them to electronic signals. Output signals are exact copies of input signals, therefore neither non-deterministic random delay, nor data losses can occur. The device operates in wide spectrum and therefore it does not impose undesirable limitations to the signals wavelengths. It is reconfigurable, since signal replication may be controlled electronically and by software, and simultaneously it is also non-blocking, which means that replication of one signal does not block simultaneous replication of other signals in real time. Described solution and developed and tested device allow direct implementation in the Internet and other networks as a switch providing multicast of input optical signals without converting them to electronic signals. Despite such high level of universal features the device is neither costly, nor complex for manufacture and use.

BRIEF DESCRIPTION OF DRAWINGS

Principle of the invention is explained hereinbelow and illustrated by enclosed drawings.

DETAILED DESCRIPTION OF THE PREFERRED EMBODIMENT

Figure 1:
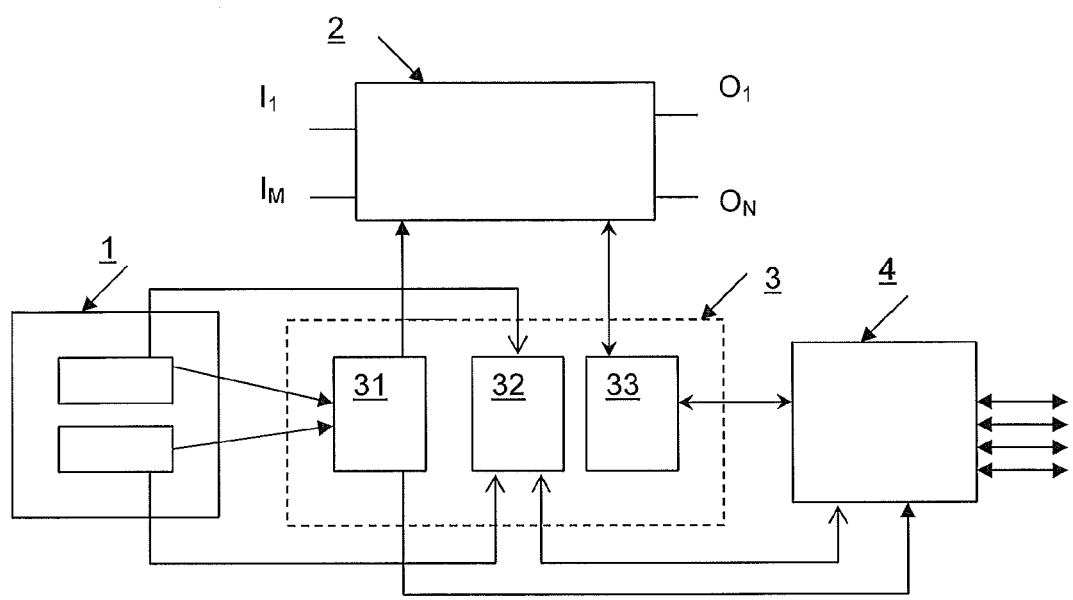
FIG. 1 shows block chart of the device.

Block chart of the device for wide-spectrum, reconfigurable, non-blocking multicast of optical signals in the Internet and other networks is shown in FIG. 1. Data streams in form of optical signal or already pre-grouped, i.e. multiplexed, optical signals enter to the device via inputs $I_1$ to $I_m$ and come out via outputs $O_1$ to $O_N$. The device may be described by the following basic function blocks: optical part 2, power supply part 1, interface module 3 and control module 4. Optical part is double-stage. Optical part with M inputs $I_m$, $1 \le m \le M$, and N outputs $O_n$, $1 \le n \le N$, is designed only as double-stage to achieve minimum insertion loss. First stage performs branching of M input signals in such a way that each input $I_m$ is split into N contributory signals $P_{m1} \ldots P_{mN}$. This stage is realized by M wide-spectrum optical splitters, each with N outputs. Second stage of the optical part then performs assignment of required contributory signal to relevant output. This stage is realized by N wide-spectrum optical switches, each with M inputs in such a way that inputs of each wide-spectrum optical switch n, $1 \le n \le N$, are connected to contributory signals $P_{1n} \ldots P_{Mn}$. Output of each wide-spectrum optical switch n is then directly assigned to the output $O_n$ of the device.

First stage 21 provides branching of input optical signals as such. Using passive wide-spectrum optical splitters allows to achieve functionality of the device in very wide part of optical spectrum. Second stage 22 then performs assignment of required contributory signal to relevant output. To achieve wide-spectrum characteristics of the device this stage uses wide-spectrum optical switches.

Interface module 3 is connected to control module 4, optical part 2 and power supply part 1. Module 3 is formed by three parts—power supply part 31, measuring part 32 and interface 33 for the optical part 2. Power supply part 31 of module 3 provides distribution of power supply to optical part 2 and control module 4. Measuring part 32 of module 3 provides measuring basic operational parameters of the device, such as power supply voltage, temperature and fan speeds. Interface part 33 then provides communication of the optical part 2 with control module 4.

Power supply part 1 provides redundant power supply of the whole device; it exists in version for 230 V AC as well as for 48 V DC or combination of both.

Control module 4, in this case a low-power single-board computer compatible with the x86 platform, provides in particular communication of the device with its neighborhood and in co-operation with module 3 it collects data for the device supervision and reception of data required for configuration and flawless function of the device. Control module 4 provides for the world outside the access to input/output interfaces, such as standard interface for communication with user, interface for communication in Ethernet network, interface via RS 232 and interface for communication via standard serial bus USB.

Figure 2:
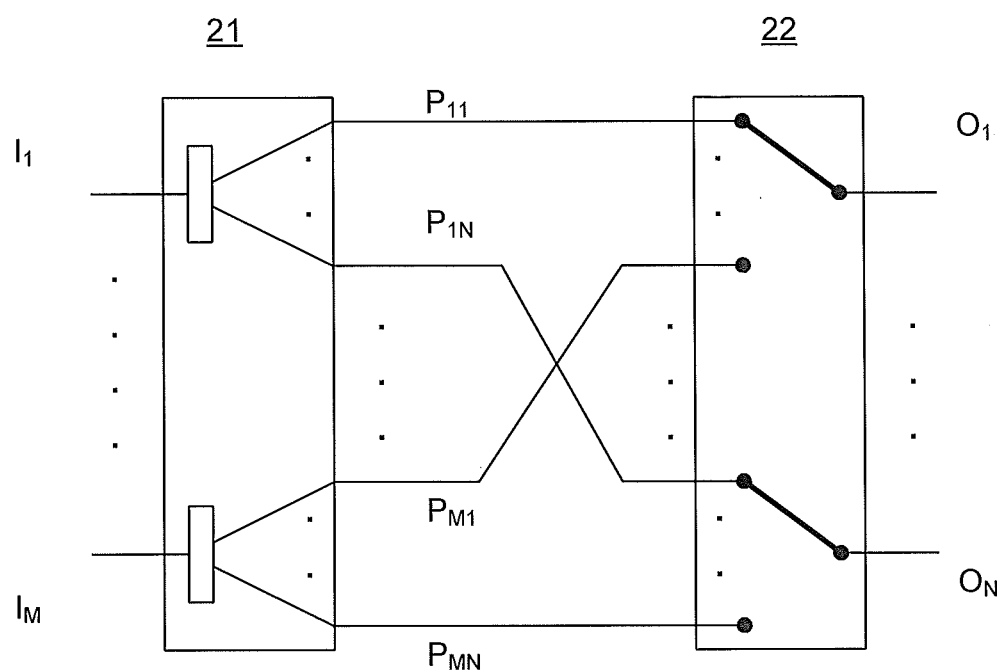
FIG. 2 shows block chart of the optical part.
Figure 3:
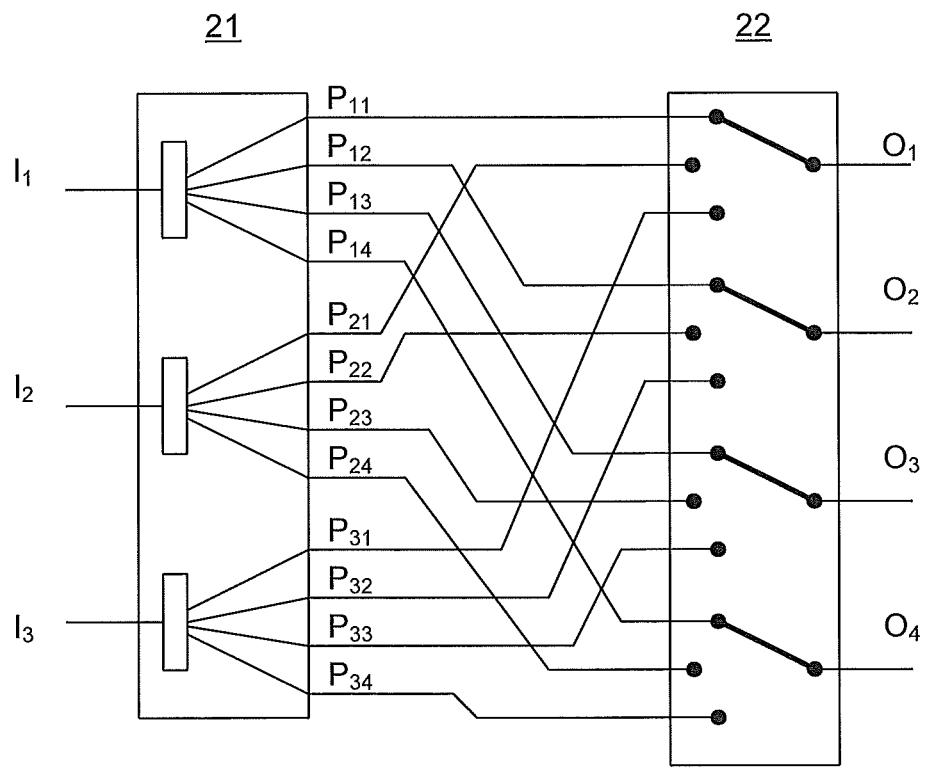
FIG. 3 illustrates specific possible connection of optical part for version with 3 inputs and 4 outputs.

Optical part 2 is powered via module 3, which also provides for its communication with control module 4. Optical part 2 is formed by two stages, see FIG. 2. Interconnection of stages is illustrated in FIG. 3 for one possible configuration with 3 inputs and 4 outputs. First stage 21 performs branching of each of the three input optical signals into four contributory signals. Three passive wide-spectrum 1-to-4 optical splitters used here guarantee that the device may be used from O-band to L-band. Second stage 22 performs assignment of one signal from each trinity of contributory signals to 1 of the 4 outputs. To maintain usability from O-band to L-band, this stage is designed using four wide-spectrum 3-to-1 optical switches.

We may therefore conclude that the device for wide-spectrum, reconfigurable multicast of optical signals is equipped with control module 4 serving mainly for communication of the device with its neighborhood, which in co-operation with interface module 3 also collects data for the device supervision and reception of data required for configuration and flawless function of the device. Control module 4 (in this case preferably a low-power single-board computer compatible with the x86 platform) offers interface for communication with user and modules, interface for communication via Ethernet, RS 232 or USB bus. Module 4 provides comfort control and management of the device thus allowing its easy integration into already built optical network infrastructure.

The device is designed with focus on maximum reliability. Power supply part 1 is redundant, power supply of control module 4 is independent on power supply of optical part 2. This feature along with the optical part 2 design ensure that in case of the control module 4 collapse or fault of the whole power supply part 1 or even total power supply failure, the device's optical functionalities will remain operating and set in the last known configuration.

From optical point of view, the device is non-blocking, it therefore allows realizing any combination of input assignment to one up to all outputs and in addition also the assignment of so far unused output to an input will not affect outputs already assigned. Moreover, the device excels by bi-directionality (use in both directions), absolute transparency (it works with signals with single wavelength but also with groups of signals with different wavelengths—WDM). The device also operates in wide spectrum of wavelengths (from O-band to L-band) and shows identical insertion loss for any type of internal setting.

INDUSTRIAL APPLICABILITY

Industrial applicability of this solution is very good. The device allows repetitive production and its fabrication is not complicated. Deployment of this device will allow building large optical computer networks with determined quality of "point-multipoint" type transmissions, thus providing their wider and better quality implementation for interactive multimedia applications.

The invention claimed is:

1. A device for multicast of optical signals in the Internet and other networks comprising an electronic part and an optical part where the electronic part consists of a control module, an interface module formed by a power supply block, a block for measuring basic operational parameters of the whole device and an interface, and by a power supply part, wherein the control module is a control low-power single-board computer with fan-less processor compatible with x86 family and disk without any moving parts and where the power supply block of the interface module is connected to the power supply part, to the optical part and to the control module; the interface is connected to the optical part and to the control module, and the block for measuring basic operational parameters of the whole device is connected to the power supply part and to the control module, and wherein input/output interfaces involving a standard interface for communication with a user and/or an interface for communication in an Ethernet network and/or an interface via RS 232 and/or an interface for communication via serial USB bus are connected to the control module, and wherein the optical part of the device is designed as a double-stage, where the first stage is formed by M passive wide-spectrum optical splitters, each of which is equipped with N outputs, and the second stage is realized by N wide-spectrum optical switches, each of which is equipped with M inputs.

2. A device according to claim 1, wherein the power supply part is formed by redundant power supply sources.

3. A device according to claim 2, wherein the power supply part is formed by alternating current sources with voltage 230 V and/or by direct current sources with voltage 48 V.

4. A device according to claim 1, wherein the power supply part is formed by alternating current sources with voltage 230 V and/or by direct current sources with voltage 48 V.

* * * * *